United States Patent
Okamatsu et al.

(10) Patent No.: US 7,242,571 B2
(45) Date of Patent: Jul. 10, 2007

(54) DIELECTRIC CERAMIC, MANUFACTURING METHOD THEREFOR, AND MULTILAYER CERAMIC CAPACITOR

(75) Inventors: Toshihiro Okamatsu, Moriyama (JP); Harunobu Sano, Kyoto (JP)

(73) Assignee: Murata Manufacturing Co. Ltd. (JP)

( * ) Notice: Subject to any disclaimer, the term of this patent is extended or adjusted under 35 U.S.C. 154(b) by 493 days.

(21) Appl. No.: 10/506,858

(22) PCT Filed: Jan. 30, 2004

(86) PCT No.: PCT/JP2004/000970

§ 371 (c)(1),
(2), (4) Date: Sep. 2, 2004

(87) PCT Pub. No.: WO2004/067473

PCT Pub. Date: Aug. 12, 2004

(65) Prior Publication Data

US 2005/0122639 A1  Jun. 9, 2005

(30) Foreign Application Priority Data

Jan. 31, 2003  (JP)  ............................. 2003-023121

(51) Int. Cl.
*H01G 4/06* (2006.01)

(52) U.S. Cl. ................. 361/321.2; 361/321.1; 361/321.4; 361/311; 361/312; 361/313; 361/306.1; 501/134; 501/138; 501/139; 252/62.3

(58) Field of Classification Search ............ 361/321.1, 361/321.2, 321.4, 306.1, 306.2, 306.3, 311–313; 501/134–139; 252/520, 62.3
See application file for complete search history.

(56) References Cited

U.S. PATENT DOCUMENTS

| | | | |
|---|---|---|---|
| 5,453,409 A | | 9/1995 | Kishi et al. |
| 5,852,542 A | * | 12/1998 | Wada et al. ............. 361/321.5 |
| 5,995,360 A | * | 11/1999 | Hata et al. ................ 361/321.5 |
| 6,051,516 A | * | 4/2000 | Mizuno et al. ............ 501/138 |
| 6,346,497 B1 | * | 2/2002 | Nakamura et al. .......... 501/138 |
| 6,437,970 B1 | * | 8/2002 | Lee et al. .................... 361/311 |
| 6,522,521 B2 | * | 2/2003 | Mizuno et al. .......... 361/321.4 |
| 7,046,502 B2 | * | 5/2006 | Murosawa et al. ...... 361/321.2 |

FOREIGN PATENT DOCUMENTS

| | | |
|---|---|---|
| JP | 04-025005 | 1/1992 |
| JP | 04-349168 | 12/1992 |
| JP | 04-359811 | 12/1992 |

(Continued)

*Primary Examiner*—Nguyen T. Ha
(74) *Attorney, Agent, or Firm*—Dickstein, Shapiro, LLP.

(57) ABSTRACT

A dielectric ceramic is obtained by the steps of obtaining a reaction product composed of a barium titanate base composite oxide represented by the general formula $(Ba_{1-h-i-m}Ca_hSr_iGd_m)k(Ti_{1-y-j-n}Zr_yHf_jMg_n)O_3$, in which $0.995 \leq k \leq 1.015$, $0 \leq h \leq 0.03$, $0 \leq i \leq 0.03$, $0.015 \leq m \leq 0.035$, $0 \leq y < 0.05$, $0 \leq j < 0.05$, $0 \leq (y+j) < 0.05$, and $0.015 \leq n \leq 0.035$ hold; mixing less than 1.5 moles of Ma (Ba or the like), less than 1.0 mole of Mb (Mn or the like), and 0.5 to 2.0 moles of Mc (Si or the like) with respect to 100 moles of the reaction product; and firing the mixture thus obtained. This dielectric ceramic has superior humidity resistance, satisfies the F characteristic of the JIS standard and the Y5V characteristic of the EIA standard, has a relative dielectric constant of 9,000 or more, and has superior high-temperature reliability.

20 Claims, 1 Drawing Sheet

FOREIGN PATENT DOCUMENTS

| | | |
|---|---|---|
| JP | 05-217793 | 8/1993 |
| JP | 05-217794 | 8/1993 |
| JP | 08-008137 | 1/1996 |
| JP | HEI 11-278930 | 10/1999 |
| JP | 2001-039765 | 2/2001 |
| JP | 2001-097772 | 4/2001 |
| JP | 2001-097773 | 4/2001 |

* cited by examiner

DIELECTRIC CERAMIC, MANUFACTURING METHOD THEREFOR, AND MULTILAYER CERAMIC CAPACITOR

TECHNICAL FIELD

The present invention relates to a dielectric ceramic, a manufacturing method thereof, and a multilayer ceramic capacitor formed of this dielectric ceramic. In particular, the present invention relates to improvements in the dielectric constant of a dielectric ceramic, in the temperature characteristics of the dielectric constant of a dielectric ceramic layer which is formed of the above dielectric ceramic and which forms a multilayer ceramic capacitor, and in the reliability thereof.

BACKGROUND ART

A multilayer ceramic capacitor is generally formed as described below.

First, ceramic green sheets are prepared, each having a conductive material on a surface thereof to be formed into an interior electrode which has a desired pattern, and each containing a powdered dielectric ceramic starting material. As the dielectric ceramic, for example, a ceramic primarily composed of $BaTiO_3$ is used.

Next, ceramic green sheets including the above-described ceramic green sheets provided with the conductive material are laminated to each other and are then thermally bonded to each other, thereby forming an integrated green laminate.

Next, this green laminate is fired, thereby obtaining a sintered laminate. Inside this laminate, the interior electrodes are formed using the conductive material described above.

Subsequently, on exterior surfaces of the laminate, exterior electrodes are formed to be electrically connected to specified interior electrodes. The exterior electrodes are each formed, for example, by applying a conductive paste containing a powdered conductive metal and a glass frit onto the exterior surfaces of the laminate, followed by baking.

As described above, the multilayer capacitor is formed.

In order to reduce the cost for manufacturing a multilayer ceramic capacitor as low as possible, a relatively inexpensive base metal such as nickel or copper has been frequently used in recent years as the conductive material described above for forming the interior electrodes. When a multilayer ceramic capacitor having interior electrodes made of a base metal is manufactured, firing must be performed in a neutral or a reducing atmosphere in order to prevent the base metal from being oxidized in firing.

However, by firing in a neutral or a reducing atmosphere, in general, a ceramic composed, for example, of barium titanate is extremely reduced, and as a result, a problem may arise in that the ceramic becomes semiconductive.

For solving the problem described above, in order to prevent dielectric ceramic materials from being reduced, various techniques have been proposed (for example, see Japanese Unexamined Patent Application Publication Nos. 8-8137, 2001-97772, 2001-97773, 5-217793, 5-217794, 4-25005, and 11-278930). According to the reduction-preventing techniques of a dielectric ceramic material as mentioned above, manufacturing of a multilayer ceramic capacitor using nickel or the like as an interior electrode material can be performed.

In recent years, techniques for forming electronic circuits having a higher density have significantly advanced. Accordingly, a multilayer ceramic capacitor used for the electronic circuits as described above has been increasingly required to be miniaturized and to have a larger capacity. In addition, a multilayer ceramic capacitor may be used in some cases to isolate or buffer an electric source of a microprocessor which is operated at a high speed, and in this case, since an active electron element generates a large amount of heat while being operated at a high speed, a multilayer ceramic capacitor used around a microprocessor is required to have superior reliability in a high-temperature atmosphere.

Accordingly, even when the thickness of a dielectric ceramic layer forming a multilayer ceramic capacitor can be decreased, it has been desired that a dielectric ceramic material be realized which has a low dielectric loss, superior electrical insulating properties, and high reliability.

Although the dielectric ceramic materials disclosed in Japanese Unexamined Patent Application Publication Nos. 8-8137, 2001-97772, and 2001-97773 have a high relative dielectric constant, crystal grains in the ceramic are grown larger, and when the thickness of a dielectric ceramic layer is decreased, for example, to 3 µm or less, the number of crystal grains present in one dielectric ceramic layer is decreased, and as a result, a problem of degradation in reliability occurs.

Since the dielectric ceramic materials disclosed in Japanese Unexamined Patent Application Publication Nos. 5-217793, 5-217794, and 4-25005 use Ba—Si—Li or Ba—Si—B as a sintering auxiliary agent, problems may arise in that the properties of the dielectric ceramic material largely varies depending on firing conditions and in that the reliability in a high-temperature and high-humidity atmosphere is degraded.

According to the dielectric ceramic material disclosed in Japanese Unexamined Patent Application Publication No. 11-278930, a rare earth element which is added thereto is allowed to be primarily present in crystal grain boundaries so that the reliability by a high-temperature loading test is improved and, in addition, so that a higher relative dielectric constant is obtained. However, according to this dielectric ceramic material disclosed in Japanese Unexamined Patent Application Publication No. 11-278930, as are the materials disclosed in Japanese Unexamined Patent Application Publication Nos. 8-8137, 2001-97772, and 2001-97773, since crystal grains in the ceramic grow large, when the thickness of the dielectric ceramic layer is decreased, for example, to 3 µm or less, the number of crystal grains present in one dielectric ceramic layer is decreased, and as a result, a problem of degradation in reliability occurs.

Hence, an object of the present invention is to provide a dielectric ceramic capable of satisfying the desires described above while the above-described problems are dissolved and to provide a manufacturing method thereof.

Another object of the present invention is to provide a multilayer ceramic capacitor formed using the above-described dielectric ceramic.

DISCLOSURE OF INVENTION

The inventors of the present invention found that when Gd, which is a rare earth element, replaces a part of Ba forming a barium titanate composite oxide and is contained as a solid solution in crystal grains, although the thickness of a dielectric ceramic layer of a multilayer ceramic capacitor is decreased, for example, to 3 µm or less, the reliability under high-temperature loading conditions is improved, and as a result, the present invention was finally made.

In order to solve the technical problems described above, a dielectric ceramic of the present invention comprises a primary component composed of a barium titanate base composite oxide represented by the general formula $(Ba_{1-h-i-m}Ca_hSr_iGd_m)_k(Ti_{1-y-j-n}Zr_yHf_jMg_n)O_3$, in which $0.995 \leq k \leq 1.015$, $0 \leq h \leq 0.03$, $0 \leq i \leq 0.03$, $0.015 \leq m \leq 0.035$, $0 \leq y < 0.05$, $0 \leq j < 0.05$, $0 \leq (y+j) < 0.05$, and $0.015 \leq n \leq 0.035$ hold, Ba is partly replaced with Gd, and Ti is partly replaced with Mg; and an additive component containing Ma (Ma is at least one of Ba, Sr, and Ca), Mb (Mb is at least one of Mn and Ni), and Mc (Mc is Si or includes both Si and Ti), in which Ma is contained in an amount of less than 1.5 moles (however, 0 moles are not included) with respect to 100 moles of the primary component, Mb is contained in an amount of less than 1.0 mole (however, 0 moles are not included) with respect to 100 moles of the primary component, and Mc is contained in an amount in the range of from 0.5 to 2.0 moles with respect to 100 moles of the primary component.

In the dielectric ceramic of the present invention, it is important that the primary component is represented by the general formula $(Ba_{1-h-i-m}Ca_hSr_iGd_m)_k(Ti_{1-y-j-n}Zr_yHf_jMg_n)O_3$. That is, it is important that Gd and Mg are not simply contained as an additive component, Gd replaces a part of Ba and is contained as a solid solution in the primary component, and Mg replaces a part of Ti and is contained as a solid solution in the primary component. For example, when a material containing a calcined $BaTiO_3$ base compound and Gd and/or Mg simply added thereto is fired, it has been already known that Gd in a solid solution form cannot be sufficiently present at Ba sites, and that Mg in a solid solution form cannot be sufficiently present at Ti sites.

The dielectric ceramic according to the present invention preferably further comprises, with respect to 100 moles of the primary component, 0.5 moles or less of $R_2O_3$ (R is at least one of a lanthanoid element except Gd, Y, and Sc) as a subcomponent.

In addition, the dielectric ceramic according to the present invention preferably further comprises, with respect to 100 moles of the primary component, 1 mole of less of $Al_2O_3$.

The present invention may also be applied to a method for manufacturing the dielectric ceramic as described above.

First, a method for manufacturing a dielectric ceramic, according to the present invention, comprises a first step of obtaining a reaction product composed of a barium titanate base composite oxide represented by the general formula $(Ba_{1-h-i-m}Ca_hSr_iGd_m)_k(Ti_{1-y-j-n}Zr_yHf_jMg_n)O_3$, in which $0.995 \leq k \leq 1.015$, $0 \leq h \leq 0.03$, $0.015 \leq i \leq 0.03$, $0.015 \leq m \leq 0.035$, $0 \leq y < 0.05$, $0 \leq j < 0.05$, $0 \leq (y+j) < 0.05$, and $0.015 \leq n \leq 0.035$, Ba being partly replaced with Gd, and Ti being partly replaced with Mg.

In addition, a step of preparing Ma (Ma is at least one of Ba, Sr, and Ca), Mb (Mb is at least one of Mn and Ni), and Mc (Mc is Si or includes both Si and Ti) is performed.

Subsequently, a third step of mixing the reaction product obtained in the first step and Ma, Mb, and Mc prepared in a second step is carried out so that less than 1.5 moles of Ma (however, 0 moles are not included) is contained with respect to 100 moles of the reaction product, less than 1.0 mole of Mb (however, 0 moles are not included) is contained with respect to 100 moles of the reaction product, and 0.5 to 2.0 moles of Mc is contained with respect to 100 moles of the reaction product.

Next, a fourth step of firing the mixture obtained in the third step is performed.

In the method for manufacturing a dielectric ceramic, according to the present invention, in the third step described above, 0.5 moles or less of $R_2O_3$ (R is at least one of a lanthanoid element except Gd, Y, and Sc) is preferably further mixed as a subcomponent with respect to 100 moles of the reaction product.

In addition, in the method for manufacturing a dielectric ceramic, according to the present invention, 1 mole or less of $Al_2O_3$ is preferably further mixed with respect to 100 moles of the reaction product in the third step described above.

The present invention may be further applied to a multilayer ceramic capacitor which comprises: a laminate having dielectric ceramic layers which are laminated to each other and interior electrodes which are provided along specific interfaces between dielectric ceramic layers and which are overlapped with each other in the lamination direction; and exterior electrodes formed on exterior surfaces of the laminate so as to be electrically connected to specific interior electrodes.

In the multilayer ceramic capacitor according to the present invention, the dielectric ceramic layers described above each comprise the dielectric ceramic according to the present invention, and the interior electrodes each comprise a base metal as a primary component.

According to the dielectric ceramic of the present invention as described above, when a dielectric ceramic layer for forming a multilayer ceramic capacitor is formed therefrom, since sintering stability is superior, the humidity resistance is improved, the F characteristics of the JIS standard and the Y5V characteristics of the EIA standard are satisfied, the relative dielectric constant is 9,000 or more, and the multilayer ceramic capacitor can be used in a wide temperature range.

In addition, since the humidity resistance and the high-temperature reliability are superior although the thickness of the dielectric ceramic layer is decreased, a miniaturized multilayer ceramic capacitor having a larger capacity can be realized by decreasing the thickness, and in addition, it is not necessary to decrease a rated voltage. Accordingly, even when the thickness of the dielectric ceramic layer is decreased, for example, to 3 μm or less, practically sufficient characteristics can be imparted to the multilayer ceramic capacitor.

In addition, even when being fired in a neutral or a reducing atmosphere, the dielectric ceramic of the present invention is not rendered semiconductive and may have a high specific resistance. Accordingly, when a multilayer ceramic capacitor is formed using this dielectric ceramic, a base metal can be used as a conductive component contained in interior electrodes without causing any problems, and as a result, cost of the multilayer ceramic capacitor can be reduced.

When 0.5 moles or less of $R_2O_3$ (R is at least one of a lanthanoid element except Gd, Y, and Sc) is further contained in the dielectric ceramic according to the present invention as a subcomponent with respect to 100 moles of the primary component, the lifetime under high-temperature loading conditions and/or the sintering properties can be further improved.

In addition, when 1 mole or less of $Al_2O_3$ is further contained in the dielectric ceramic according to the present invention with respect to 100 moles of the primary component, the sintering properties can be further improved.

According to the method for manufacturing a dielectric ceramic of the present invention, since the reaction product composed of a barium titanate base composite oxide is obtained in which Ba is partly replaced with Gd and Ti is partly replaced with Mg, and the necessary additive components are mixed with this reaction product, as the primary component, a dielectric ceramic can be easily and reliably obtained containing the barium titanate base composite oxide in which Ba is partly replaced with Gd and Ti is partly replaced with Mg.

BEST MODE FOR CARRYING OUT THE INVENTION

Figure 1:
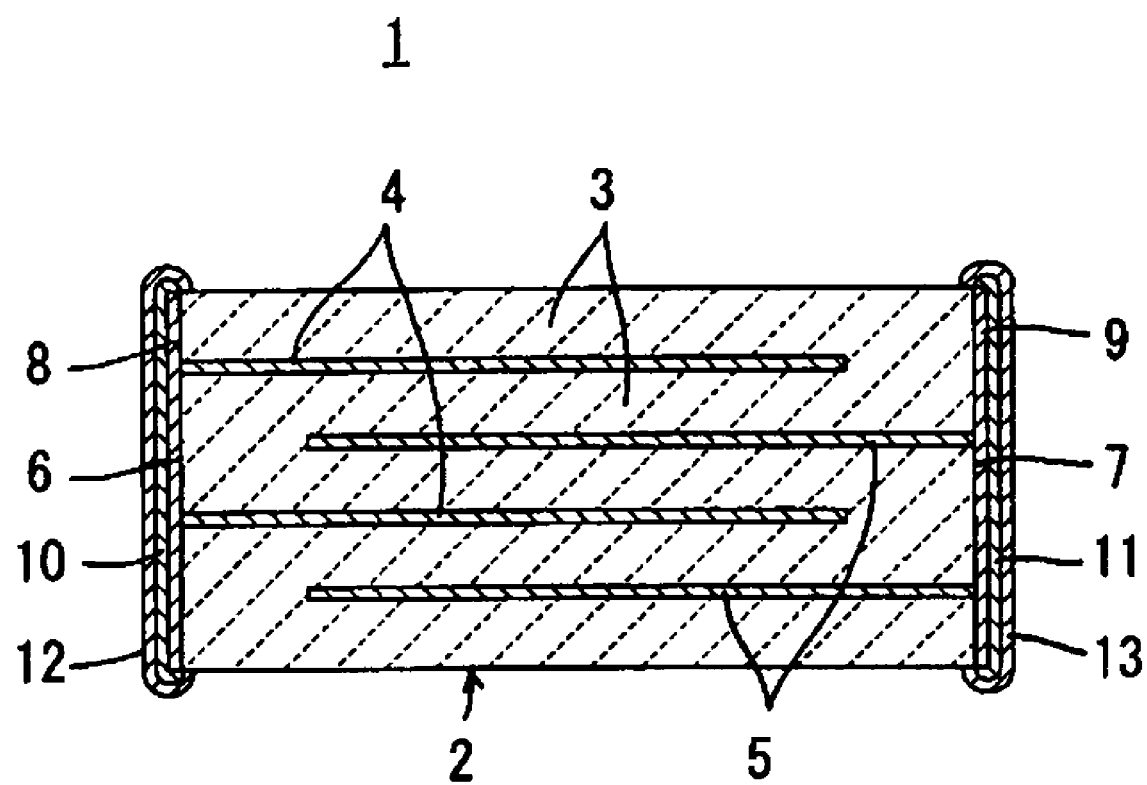
FIG. 1 is a cross-sectional view schematically showing a multilayer ceramic capacitor 1 formed using a dielectric ceramic according to the present invention.

As shown in FIG. 1, a multilayer ceramic capacitor 1 has a laminate 2 in the form of a rectangular parallelepiped on the whole. The laminate 2 is formed of a plurality of dielectric ceramic layers 3 which are laminated to each other and a plurality of interior electrodes 4 and 5 which are formed along a plurality of specific interfaces between the dielectric ceramic layers 3. The interior electrodes 4 and 5 are formed to extend to exterior surfaces of the laminate 2, and the interior electrodes 4 extending to one end surface 6 of the laminate 2 and the interior electrodes 5 extending to the other end surface 7 are alternately disposed in the laminate 2.

Onto the end surfaces 6 and 7, which are the exterior surfaces of the laminate 2, a conductive paste is applied and is then baked, thereby forming respective exterior electrodes 8 and 9. Whenever necessary, on the exterior electrodes 8 and 9, first plating layers 10 and 11 made of nickel, copper, a nickel-copper alloy, or the like are formed, and on the plating layers thus formed, second plating layers 12 and 13 made of solder, tin, or the like are formed.

As described above, in the multilayer ceramic capacitor 1, the interior electrodes 4 and 5 are formed so as to be overlapped with each other in the lamination direction of the laminate 2, and hence static capacitances are formed between the adjacent interior electrodes 4 and 5. In addition, the interior electrodes 4 are electrically connected to the exterior electrode 8, and in addition, the interior electrodes 5 are also electrically connected to the exterior electrode 9; hence, the static capacitances described above are obtained through those exterior electrodes 8 and 9.

The dielectric ceramic layer 3 is formed from the following dielectric ceramic which is the feature of the present invention.

That is, the dielectric ceramic layer 3 is formed from a dielectric ceramic which comprises a primary component of a barium titanate base composite oxide represented by the general formula $(Ba_{1-h-i-m}Ca_hSr_iGd_m)_k(Ti_{1-y-j-n}Zr_yH_fMg_n)O_3$, in which $0.995 \leq k \leq 1.015$, $0 \leq h \leq 0.03$, $0 \leq i \leq 0.03$, $0.015 \leq m \leq 0.035$, $0 \leq y < 0.05$, $0 \leq j < 0.05$, $0 \leq (y+j) < 0.05$, and $0.015 \leq n \leq 0.035$ hold, Ba is partly replaced with Gd, and Ti is partly replaced with Mg; and an additive component containing Ma (Ma is at least one of Ba, Sr, and Ca), Mb (Mb is at least one of Mn and Ni), and Mc (Mc is Si or includes both Si and Ti), in which Ma is contained in an amount of less than 1.5 moles (however, 0 moles are not included) with respect to 100 moles of the primary component, Mb is contained in an amount of less than 1.0 mole (however, 0 moles are not included) with respect to 100 moles of the primary component, and Mc is contained in an amount in the range of from 0.5 to 2.0 moles with respect to 100 moles of the primary component.

When the dielectric ceramic layer 3 is formed using the dielectric ceramic as described above, the humidity resistance is improved due to the sintering stability, the F characteristic specified by the JIS standard and the Y5V characteristic specified by the EIA standard are satisfied, the relative dielectric constant ε is 9,000 or more, and an accelerated lifetime of insulating resistance under high-temperature and high-voltage conditions is increased; hence, even when the thickness of the dielectric ceramic layer is decreased, a compact and large-capacity multilayer ceramic capacitor 1 having superior reliability can be realized. In addition, since this dielectric ceramic can be fired in a neutral or a reducing atmosphere, a base metal such as nickel, a nickel alloy, copper, or a copper alloy can be used as a material for the interior electrodes 4 and 5. In addition, a small amount of a ceramic powder may be added to a metal material forming the interior electrodes 4 and 5.

The dielectric ceramic forming the dielectric ceramic layer 3 preferably further contains 0.5 moles or less of $R_2O_3$ (R is at least one of a lanthanoid element except Gd, Y, and Sc) as a subcomponent with respect to 100 moles of the above mentioned primary component. Accordingly, the lifetime under high-temperature loading conditions and/or the sintering properties can be further improved.

In addition, the dielectric ceramic forming the dielectric ceramic layer 3 preferably further contains 1.0 mole or less of $Al_2O_3$ with respect to 100 moles of the primary component. Accordingly, the sintering properties can be further improved.

The composition of the exterior electrodes 8 and 9 is not specifically limited. The exterior electrodes 8 and 9 may be each formed, for example, of a sintered body using one of various conductive metal powders such as silver, palladium, a silver-palladium alloy, copper, and a copper alloy, or may be each formed of a sintered body composed of one of the above-mentioned conductive metal powders and a glass frit such as $B_2O_3$—$Li_2O$—$SiO_2$—$BaO$, $B_2O_3$—$SiO_2$—$BaO$, $Li_2O$—$SiO_2$—$BaO$, or $B_2O_3$—$SiO_2$—$ZnO$ base material. In addition, when the content is small, in addition to the conductive metal powder and the glass frit mentioned above, a ceramic powder may also be added.

Next, while a method for manufacturing the multilayer ceramic capacitor 1 shown in FIG. 1 is described, an embodiment of a manufacturing method of the dielectric ceramic of the present invention will be described.

First, a powdered starting material of the dielectric ceramic forming the dielectric ceramic layer 3 is prepared. The powdered starting material is preferably formed as described below.

That is, a step is first performed for obtaining a reaction product composed of a barium titanate base composite oxide represented by the general formula $(Ba_{1-h-i-m}Ca_hSr_iGd_m)_k(Ti_{1-y-j-n}Zr_yHf_jMg_n)O_3$, in which $0.995 \leq k \leq 1.015$, $0 \leq h \leq 0.03$, $0 \leq i \leq 0.03$, $0.015 \leq m \leq 0.035$, $0 \leq y < 0.05$, $0 \leq j < 0.05$, $0 \leq (y+j) < 0.05$, and $0.015 \leq n \leq 0.035$ hold, Ba is partly replaced with Gd, and Ti is partly replaced with Mg.

In more particular, in order to obtain the reaction product, compounds containing the individual elements included in the above general formula, such as powdered $BaCO_3$, $TiO_2$, $CaCO_3$, $SrCO_3$, $ZrO_2$, $HfO_2$, $Gd_2O_3$, and MgO, are mixed together so as to have the composition ratios described above and are then calcined in the air, followed by pulverization.

In this step, as the compounds containing the individual elements included in the above general formula, compounds other than the carbonates or oxides mentioned above may also be used in order to obtain the reaction product described above. In addition, besides the calcination method mentioned above as a synthetic method for obtaining the reaction product, an alkoxide method, a coprecipitation method, a hydrothermal synthesis method, and the like may also be used.

In addition, Ma (Ma is at least one of Ba, Sr, and Ca), Mb (Mb is at least one of Mn and Ni), and Mc (Mc is Si or includes both Si and Ti) are prepared. In more particular, powdered $BaCO_3$, $SrCO_3$, $CaCO_3$, MnO, NiO, $TiO_2$, and $SiO_2$ are prepared.

Next, Ma, Mb, and Mc described above are mixed with the above reaction product so that a mixture is formed in which less than 1.5 moles (however, 0 moles are not included) of Ma is contained with respect to 100 moles of the reaction product, less than 1.0 moles (however, 0 moles are not included) of Mb is contained with respect to 100 moles of the reaction product, and 0.5 to 2.0 moles of Mc is contained with respect to 100 moles of the reaction product. This mixture is used as the powdered starting material of the dielectric ceramic.

In the above mixing step in which Ma, Mb, and Mc are added, the individual powdered compounds may be separately added, or after at least two types of individual compounds are allowed to react with each other to form a powdered composite oxide, the addition may then be performed. In the latter case, a calcination method in the air may be used for the reaction, and an alkoxide method, a coprecipitation method, a hydrothermal synthesis method, and the like may also be used.

When the powdered starting material is prepared as described above, a dielectric ceramic which satisfies the conditions as described above can be easily obtained.

In the above mixing step, with respect to 100 moles of the reaction product, as a subcomponent, 0.5 moles or less of $R_2O_3$ (R is at least one of a lanthanoid element except Gd, Y, and Sc) may be further mixed. In addition, in the mixing step, with respect to 100 moles of the reaction product, 1 mole or less of $Al_2O_3$ may be further mixed.

As for an alkaline metal oxide such as $Na_2O$ or $K_2O$ which may be present as an impurity in the powdered reaction product used as the primary component, it has been verified that the content has a relatively significant influence on electrical properties. However, it has also been verified that when the content of the alkali metal oxide which may be present as an impurity is less than 0.02 percent by weight of the primary component represented by $(Ba_{1-h-i-m}Ca_h Sr_iGd_m)_k(Ti_{1-y-j-n}Zr_yHf_jMg_n)O_3$, the electrical properties are not degraded.

Next, an organic binder and a solvent are added to the powdered starting material obtained as described above, followed by mixing, thereby forming a slurry. By using the slurry thus formed, ceramic green sheets to be formed into the dielectric ceramic layers 3 are formed.

Next, on specific ceramic green sheets, conductive paste films to be formed into the interior electrodes 4 and 5 are formed, for example, by screen printing. This conductive paste film contains a base metal, such as nickel, a nickel alloy, copper, or a copper alloy, as a conductive component. In addition to the printing method such as a screen printing method, the interior electrodes 4 and 5 may also be formed, for example, by a deposition method or a plating method.

Next, after the ceramic green sheets provided with the conductive paste films as described above are laminated to each other, and in addition, ceramic green sheets which are not provided with the conductive paste films are laminated so as to sandwich the above-described ceramic green sheets, followed by compression bonding, cutting is performed whenever necessary, thereby obtaining a green laminate which is to be formed into the laminate 2. In this green laminate, the conductive paste films are each exposed at one of the end surfaces thereof.

Next, the green laminate is fired in a reducing atmosphere. By this step, the fired laminate 2 as shown in FIG. 1 is obtained, and in the laminate 2, the ceramic green sheets described above made of the dielectric ceramic each form the dielectric ceramic layer 3, and the conductive paste films form the interior electrodes 4 and 5.

The average crystal grain diameter of the dielectric ceramic forming the dielectric ceramic layer 3 described above is preferably set to 2.5 µm or less, more preferably 1.5 µm or less, and even more preferably 1 µm or less.

Next, the exterior electrodes 8 and 9 are formed on the end surfaces 6 and 7 of the laminate 2 by baking the conductive paste so as to be electrically connected to the respective exposed ends of the interior electrodes 4 and 5.

As described above, the exterior electrodes 8 and 9 are generally formed by applying a conductive paste on the exterior surfaces of the fired laminate 2, followed by baking; however, they may be formed by applying a conductive paste on the exterior surfaces of the green laminate before firing, followed by baking which is simultaneously performed with the firing carried out for obtaining the laminate 2.

Subsequently, whenever necessary, on the exterior electrodes 8 and 9, plating of nickel, copper, or the like is performed, thereby forming the first plating layers 10 and 11. Then, on the first plating layers 10 and 11, plating of solder, tin, or the like is performed, thereby forming the second plating layers 12 and 13.

As described above, the multilayer ceramic capacitor 1 is formed.

Next, the present invention will be described in particular with reference to experimental examples. The experimental examples also have meaning of showing the reasons the scope of the present invention or a preferable scope thereof is defined.

EXPERIMENTAL EXAMPLE 1

As stating materials for a dielectric ceramic, powdered $BaCO_3$, $CaCO_3$, $SrCO_3$, $TiO_2$, $ZrO_2$, $HfO_2$, $Gd_2O_3$, $MgCO_3$, MnO, NiO, and $SiO_2$, each having a purity of 99.8% or more, were prepared.

Next, in order to obtain a first reaction product represented by $(Ba_{1-h-i-m}Ca_hSr_iGd_m)_k(Ti_{1-y-j-n}Zr_yHf_jMg_n)O_3$, specified materials among the above starting materials were mixed together in accordance with the composition in the column of "First Reaction Product" shown in Tables 1 and 2 and were then calcined in the air, followed by pulverization.

In addition, in order to obtain a second reaction product containing Ma (at least one of Ba, Sr, and Ca), Mb (at least one of Mn and Ni), and Mc (Si or both Si and Ti), specified materials among the above starting materials were mixed together in accordance with the composition in the column of "Second Reaction Product" shown in Tables 1 and 2 and were calcined in the air, followed by pulverization.

In the column of "Second Reaction Product" in Tables 1 and 2, respective elements used as Ma, Mb, and Mc and molar ratios thereof are represented by "molar ratio/element". This molar ratio shows a molar ratio between Ma, Mb, and Mc, and also shows a molar ratio with respect to 100 moles of the first reaction product.

TABLE 1

| | FIRST REACTION PRODUCT | | | | | | | SECOND REACTION PRODUCT | | |
| --- | --- | --- | --- | --- | --- | --- | --- | --- | --- | --- |
| SAMPLE NO. | k | Ca H | Sr i | Zr y | Hf j | Gd m | Mg n | Ma MOLAR RATIO/ ELEMENT | Mb MOLAR RATIO/ ELEMENT | Mc MOLAR RATIO/ ELEMENT |
| 1-1 | 0.995 | 0.00 | 0.00 | 0.03 | 0.00 | 0.025 | 0.025 | 0.4/Ba | 0.5/Mn | 0.8/Si |
| 1-2 | 1.015 | 0.00 | 0.00 | 0.03 | 0.00 | 0.025 | 0.025 | 0.2/Ba 0.1/Ca | 0.3/Mn | 1.0/Si 0.4/Ti |
| 1-3 | 1.000 | 0.03 | 0.00 | 0.03 | 0.00 | 0.025 | 0.025 | 0.8/Ba | 0.3/Mn 0.1/Ni | 1.2/Si |
| 1-4 | 1.000 | 0.00 | 0.03 | 0.03 | 0.00 | 0.025 | 0.025 | 0.8/Ba | 0.3/Mn | 0.9/Si |
| 1-5 | 1.000 | 0.00 | 0.00 | 0.04 | 0.00 | 0.025 | 0.025 | 0.8/Ba 0.6/Sr | 0.4/Mn | 1.0/Si |
| 1-6 | 1.000 | 0.00 | 0.00 | 0.00 | 0.04 | 0.025 | 0.025 | 0.8/Ba | 0.2/Mn 0.2/Ni | 0.9/Si 0.1/Ti |
| 1-7 | 1.000 | 0.00 | 0.00 | 0.02 | 0.02 | 0.025 | 0.025 | 0.8/Ba | 0.2/Mn 0.2/Ni | 0.9/Si 0.1/Ti |
| 1-8 | 1.000 | 0.00 | 0.00 | 0.03 | 0.00 | 0.015 | 0.025 | 0.8/Ba | 0.6/Mn | 0.8/Si |
| 1-9 | 1.000 | 0.00 | 0.00 | 0.03 | 0.00 | 0.035 | 0.025 | 0.4/Ba | 0.4/Mn | 1.3/Si 0.2/Ti |
| 1-10 | 1.000 | 0.00 | 0.00 | 0.03 | 0.00 | 0.025 | 0.015 | 0.8/Ba | 0.6/Mn | 0.7/Si |
| 1-11 | 1.000 | 0.00 | 0.00 | 0.03 | 0.00 | 0.025 | 0.035 | 0.2/Ba | 0.3/Mn | 1.4/Si 0.1/Ti |
| 1-12 | 0.997 | 0.00 | 0.00 | 0.03 | 0.00 | 0.025 | 0.025 | 0.1/Ba | 0.3/Mn | 0.7/Si |
| 1-13 | 1.001 | 0.00 | 0.00 | 0.03 | 0.00 | 0.025 | 0.025 | 0.7/Ba 0.7/Ca | 0.4/Mn | 1.4/Si |
| 1-14 | 1.000 | 0.00 | 0.00 | 0.03 | 0.00 | 0.025 | 0.025 | 0.8/Sr | 0.3/Mn 0.1/Ni | 1.0/Si |
| 1-15 | 1.000 | 0.00 | 0.00 | 0.03 | 0.00 | 0.025 | 0.025 | 0.2/Ba | 0.1/Mn | 1.3/Si |
| 1-16 | 1.000 | 0.00 | 0.00 | 0.03 | 0.00 | 0.025 | 0.025 | 0.8/Ba | 0.9/Ni | 0.7/Si 0.2/Ti |
| 1-17 | 1.000 | 0.00 | 0.00 | 0.03 | 0.00 | 0.025 | 0.025 | 0.3/Ba | 0.3/Mn 0.1/Ni | 0.3/Si 0.2/Ti |
| 1-18 | 1.000 | 0.00 | 0.00 | 0.03 | 0.00 | 0.025 | 0.025 | 0.8/Ba | 0.6/Mn | 2.0/Si |

TABLE 2

| | FIRST REACTION PRODUCT | | | | | | | SECOND REACTION PRODUCT | | |
| --- | --- | --- | --- | --- | --- | --- | --- | --- | --- | --- |
| SAMPLE NO. | k | Ca H | Sr i | Zr y | Hf j | Gd m | Mg n | Ma MOLAR RATIO/ ELEMENT | Mb MOLAR RATIO/ ELEMENT | Mc MOLAR RATIO/ ELEMENT |
| * 1-101 | 0.992 | 0.00 | 0.00 | 0.03 | 0.00 | 0.025 | 0.025 | 0.4/Ba | 0.5/Mn | 0.8/Si |
| * 1-102 | 1.018 | 0.00 | 0.00 | 0.03 | 0.00 | 0.025 | 0.025 | 0.2/Ba 0.1/Ca | 0.3/Mn | 1.0/Si 0.4/Ti |
| * 1-103 | 1.000 | 0.05 | 0.00 | 0.03 | 0.00 | 0.025 | 0.025 | 0.8/Ba | 0.3/Mn 0.1/Ni | 1.2/Si |
| * 1-104 | 1.000 | 0.00 | 0.05 | 0.03 | 0.00 | 0.025 | 0.025 | 0.8/Ba | 0.3/Mn | 0.9/Si |
| * 1-105 | 1.000 | 0.00 | 0.00 | 0.06 | 0.00 | 0.025 | 0.025 | 0.8/Ba 0.6/Sr | 0.4/Mn | 1.0/Si |
| * 1-106 | 1.000 | 0.00 | 0.00 | 0.00 | 0.06 | 0.025 | 0.025 | 0.8/Ba | 0.2/Mn 0.2/Ni | 0.9/Si 0.1/Ti |
| * 1-107 | 1.000 | 0.00 | 0.00 | 0.02 | 0.04 | 0.025 | 0.025 | 0.8/Ba | 0.2/Mn 0.2/Ni | 0.9/Si 0.1/Ti |
| * 1-108 | 1.000 | 0.00 | 0.00 | 0.03 | 0.00 | 0.012 | 0.025 | 0.8/Ba | 0.6/Mn | 0.8/Si |
| * 1-109 | 1.000 | 0.00 | 0.00 | 0.03 | 0.00 | 0.038 | 0.025 | 0.4/Ba | 0.4/Mn | 1.3/Si 0.2/Ti |
| * 1-110 | 1.000 | 0.00 | 0.00 | 0.03 | 0.00 | 0.025 | 0.012 | 0.8/Ba | 0.6/Mn | 0.7/Si |
| * 1-111 | 1.000 | 0.00 | 0.00 | 0.03 | 0.00 | 0.025 | 0.038 | 0.2/Ba | 0.3/Mn | 1.4/Si 0.1/Ti |
| * 1-112 | 0.995 | 0.00 | 0.00 | 0.03 | 0.00 | 0.025 | 0.025 | 0.0 | 0.3/Mn | 0.7/Si |
| * 1-113 | 1.002 | 0.00 | 0.00 | 0.03 | 0.00 | 0.025 | 0.025 | 0.9/Ba 0.8/Ca | 0.4/Mn | 1.4/Si |
| * 1-114 | 1.000 | 0.00 | 0.00 | 0.03 | 0.00 | 0.025 | 0.025 | 0.2/Ba | 0.0 | 1.3/Si |
| * 1-115 | 1.000 | 0.00 | 0.00 | 0.03 | 0.00 | 0.025 | 0.025 | 0.8/Ba | 1.2/Ni | 0.7/Si 0.2/Ti |
| * 1-116 | 1.000 | 0.00 | 0.00 | 0.03 | 0.00 | 0.025 | 0.025 | 0.3/Ba | 0.3/Mn 0.1/Ni | 0.2/Si 0.1/Ti |
| * 1-117 | 1.000 | 0.00 | 0.00 | 0.03 | 0.00 | 0.025 | 0.025 | 0.8/Ba | 0.6/Mn | 2.2/Si |

Next, the second reaction products were added so as to have molar ratios as shown in Tables 1 and 2 with respect to 100 moles of the first reaction product, and the mixtures thus obtained were used as powdered dielectric ceramic starting materials for individual samples.

Next, to each of the powdered dielectric ceramic starting materials shown in Tables 1 and 2, a polyvinyl butyral base binder and an organic solvent such as ethanol were added, followed by wet mixing using a ball mill, thereby forming a ceramic slurry.

Next, the ceramic slurry was formed into a sheet shape by a doctor blade method, so that rectangular ceramic green sheets were obtained each of which was to have a thickness of 3 μm after firing.

Next, onto each of the ceramic green sheets, a conductive paste primarily composed of nickel was applied, thereby forming a conductive paste film to be formed into an interior electrode.

Next, the ceramic green sheets were laminated to each other so that ends thereof to which the above conductive paste films extended were alternately disposed, thereby obtaining a green laminate.

Next, after the green laminate was heated to a temperature of 350° C. in a nitrogen atmosphere to burn away the binder, in a reducing atmosphere composed of a $H_2$—$N_2$—$H_2O$ gas at an oxygen partial pressure of $10^{-9}$ to $10^{-12}$ MPa, firing was performed for 2 hours at a corresponding temperature among those shown in Tables 3 and 4, thereby obtaining a sintered laminate.

Next, onto two end surfaces of the sintered laminate, a conductive paste containing silver as a conductive component in addition to a $B_2O_3$—$Li_2O$—$SiO_2$—$BaO$ base glass frit was applied and was fired at a temperature of 600° C. in a nitrogen atmosphere, thereby forming exterior electrodes electrically connected to the interior electrodes.

The exterior dimensions of the multilayer ceramic capacitor thus formed were 1.6 mm wide, 3.2 mm long, and 1.2 mm thick, and the thickness of the dielectric ceramic layer present between the interior electrodes was 3 μm. In addition, the number of effective dielectric ceramic layers was 100, and a counter electrode area per layer was 2.1 mm².

For the samples thus obtained, the following evaluations were performed.

First, the relative dielectric constant ($\epsilon$) was obtained at a temperature of 25° C. by application of 1 $V_{rms}$ at 1 kHz.

In addition, by using a static capacitance at a temperature of 20° C. as the basis, the minimum and the maximum rate of change in capacitance by AC application of 1 $V_{rms}$ at 1 kHz in the range of from −25 to +85° C. were measured for evaluation whether the Y5V characteristic was satisfied or not. In addition, by using a static capacitance at a temperature of 25° C. as the basis, the minimum and the maximum rate of change in capacitance by AC application of 1 $V_{rms}$ at 1 kHz in the range of from −30 to +85° C. were measured for evaluation whether the Y5V characteristic was satisfied or not.

In addition, from a static capacitance-temperature curve in the range of from −25 to 85° C. obtained in an AC electric field of 25 $V_{rms}$/mm at 1 kHz, the temperature was identified at which a peak capacitance was obtained. In this case, when the AC voltage is increased, an apparent capacitance in a temperature range in which the ferroelectricity is observed is increased, and as a result, the temperature of the peak capacitance is shifted to a lower temperature side. Accordingly, in this measurement, an electric field of 25 $V_{rms}$/mm was used which was sufficiently low so that the peak temperature was not shifted.

In addition, a high-temperature loading lifetime test was performed. The high-temperature loading lifetime test was a test for obtaining the change in insulating resistance with time from 36 test pieces at a temperature of 150° C. by applying 30 volts thereto so as to have an electric field of 10 kV/mm. As the high-temperature loading lifetime, times at which the insulating resistance of the individual samples reached 200 kΩ or less were regarded as the lifetime, and the average lifetime was obtained therefrom.

In addition, the cross section of the dielectric ceramic layer of the multilayer ceramic capacitor formed from each of the samples was photographed using a scanning electron microscope, and crystal grain diameters were obtained from the photograph thus taken. Subsequently, after 30 crystals or more were selected, the average value of the crystal grain diameters was obtained.

The evaluation results are shown in Tables 3 and 4.

TABLE 3

| SAMPLE NO. | FIRING TEMPERATURE (° C.) | RELATIVE DIELECTRIC CONSTANT | F CHARACTERISTIC | Y5V CHARACTERISTIC | TEMPERATURE OF PEAK CAPACITANCE AT LOW ELECTRIC FIELD (° C.) | AVERAGE LIFETIME UNDER HIGH-TEMPERATURE LOADING CONDITIONS (HOURS) | AVERAGE CRYSTAL GRAIN DIAMETER (μm) |
|---|---|---|---|---|---|---|---|
| 1-1 | 1200 | 10500 | WITHIN SPECIFICATION | WITHIN SPECIFICATION | 75 | 25 | 2.3 |
| 1-2 | 1230 | 9100 | WITHIN SPECIFICATION | WITHIN SPECIFICATION | 10 | 40 | 1.4 |
| 1-3 | 1220 | 9200 | WITHIN SPECIFICATION | WITHIN SPECIFICATION | 47 | 35 | 1.3 |
| 1-4 | 1240 | 9600 | WITHIN SPECIFICATION | WITHIN SPECIFICATION | 0 | 25 | 1.7 |
| 1-5 | 1220 | 9800 | WITHIN SPECIFICATION | WITHIN SPECIFICATION | 5 | 17 | 2.0 |
| 1-6 | 1230 | 9600 | WITHIN SPECIFICATION | WITHIN SPECIFICATION | 10 | 16 | 1.5 |
| 1-7 | 1220 | 9400 | WITHIN SPECIFICATION | WITHIN SPECIFICATION | 8 | 18 | 1.4 |
| 1-8 | 1210 | 10700 | WITHIN SPECIFICATION | WITHIN SPECIFICATION | 55 | 15 | 2.4 |
| 1-9 | 1240 | 9700 | WITHIN SPECIFICATION | WITHIN SPECIFICATION | −5 | 38 | 1.6 |

TABLE 3-continued

| SAMPLE NO. | FIRING TEMPERATURE (° C.) | RELATIVE DIELECTRIC CONSTANT | F CHARACTERISTIC | Y5V CHARACTERISTIC | TEMPERATURE OF PEAK CAPACITANCE AT LOW ELECTRIC FIELD (° C.) | AVERAGE LIFETIME UNDER HIGH-TEMPERATURE LOADING CONDITIONS (HOURS) | AVERAGE CRYSTAL GRAIN DIAMETER (μm) |
|---|---|---|---|---|---|---|---|
| 1-10 | 1210 | 10600 | WITHIN SPECIFICATION | WITHIN SPECIFICATION | 59 | 27 | 2.2 |
| 1-11 | 1240 | 9200 | WITHIN SPECIFICATION | WITHIN SPECIFICATION | −3 | 40 | 1.3 |
| 1-12 | 1200 | 11800 | WITHIN SPECIFICATION | WITHIN SPECIFICATION | 80 | 23 | 2.3 |
| 1-13 | 1240 | 9600 | WITHIN SPECIFICATION | WITHIN SPECIFICATION | 36 | 38 | 1.3 |
| 1-14 | 1230 | 10400 | WITHIN SPECIFICATION | WITHIN SPECIFICATION | 22 | 29 | 2.1 |
| 1-15 | 1230 | 10000 | WITHIN SPECIFICATION | WITHIN SPECIFICATION | 35 | 18 | 2.0 |
| 1-16 | 1230 | 9100 | WITHIN SPECIFICATION | WITHIN SPECIFICATION | 20 | 32 | 1.2 |
| 1-17 | 1250 | 9400 | WITHIN SPECIFICATION | WITHIN SPECIFICATION | 32 | 24 | 1.4 |
| 1-18 | 1190 | 11000 | WITHIN SPECIFICATION | WITHIN SPECIFICATION | 57 | 18 | 2.5 |

TABLE 4

| SAMPLE NO. | FIRING TEMPERATURE (° C.) | RELATIVE DIELECTRIC CONSTANT | F CHARACTERISTIC | Y5V CHARACTERISTIC | TEMPERATURE OF PEAK CAPACITANCE AT LOW ELECTRIC FIELD (° C.) | AVERAGE LIFETIME UNDER HIGH-TEMPERATURE LOADING CONDITIONS (HOURS) | AVERAGE CRYSTAL GRAIN DIAMETER (μm) |
|---|---|---|---|---|---|---|---|
| * 1-101 | 1180 | 11500 | WITHIN SPECIFICATION | WITHIN SPECIFICATION | 85 | 6 | 2.8 |
| * 1-102 | 1260 | 8400 | WITHIN SPECIFICATION | WITHIN SPECIFICATION | 0 | 48 | 1.3 |
| * 1-103 | 1240 | 8000 | WITHIN SPECIFICATION | WITHIN SPECIFICATION | 53 | 28 | 1.2 |
| * 1-104 | 1250 | 9000 | WITHIN SPECIFICATION | WITHIN SPECIFICATION | −15 | 5 | 1.5 |
| * 1-105 | 1230 | 9400 | WITHIN SPECIFICATION | WITHIN SPECIFICATION | −17 | 2 | 2.0 |
| * 1-106 | 1230 | 9300 | WITHIN SPECIFICATION | WITHIN SPECIFICATION | −15 | 4 | 1.8 |
| * 1-107 | 1230 | 9200 | WITHIN SPECIFICATION | WITHIN SPECIFICATION | −13 | 4 | 1.4 |
| * 1-108 | 1200 | 11400 | OUTSIDE SPECIFICATION | OUTSIDE SPECIFICATION | 63 | 6 | 2.5 |
| * 1-109 | 1250 | 8800 | WITHIN SPECIFICATION | WITHIN SPECIFICATION | −15 | 46 | 1.2 |
| * 1-110 | 1210 | 11300 | OUTSIDE SPECIFICATION | OUTSIDE SPECIFICATION | 63 | 20 | 2.5 |
| * 1-111 | 1250 | 8100 | WITHIN SPECIFICATION | WITHIN SPECIFICATION | −13 | 42 | 0.9 |
| * 1-112 | 1180 | 12600 | OUTSIDE SPECIFICATION | OUTSIDE SPECIFICATION | 90 | 2 | 3.0 |
| * 1-113 | 1270 | 8600 | WITHIN SPECIFICATION | WITHIN SPECIFICATION | 40 | 43 | 1.1 |
| * 1-114 | 1250 | | | SEMICONDUCTORIZED | | | |
| * 1-115 | 1240 | 8900 | WITHIN SPECIFICATION | WITHIN SPECIFICATION | 15 | 38 | 1.2 |
| * 1-116 | 1280 | 8200 | WITHIN SPECIFICATION | WITHIN SPECIFICATION | 17 | 22 | 1.0 |
| * 1-117 | 1180 | 12000 | OUTSIDE SPECIFICATION | OUTSIDE SPECIFICATION | 65 | 2 | 3.5 |

In Tables 1 to 4, sample Nos. provided with asterisks * are samples outside of the scope of the present invention.

According to samples 1-1 to 1-18 within the scope of the present invention, $0.995 \leq k \leq 1.015$, $0 \leq h \leq 0.03$, $0 \leq i \leq 0.03$, $0 \leq y < 0.05$, $0 \leq j < 0.05$, $0.015 \leq m \leq 0.035$, $0.015 \leq n \leq 0.035$, and $0 < (y+j) < 0.05$ held, and individual conditions in which less than 1.5 moles of Ma was contained with respect to 100 moles of the first reaction product, less than 1.0 mole of Mb was contained with respect to 100 moles of the first reaction product, and 0.5 to 2.0 moles of Mc was contained with respect to 100 moles of the first reaction product were satisfied as shown in Table 1.

As a result, according to samples 1-1 to 1-18, firing at a temperature of 1,250° C. or less can be performed, a relative dielectric constant of 9,000 or more can be obtained, the F characteristic and the Y5V characteristic are each within the specification, and the average lifetime under high-temperature loading conditions is relatively long as shown in Table 3.

On the other hand, in sample 1-101 which is outside the scope of the present invention, since the k value is less than 0.995 as shown in Table 2, the average lifetime under high-temperature loading conditions is short as shown in Table 4. In addition, in sample 1-102 which is outside the scope of the present invention, the k value is more than 1.015 as shown in Table 2; hence, as shown in Table 4, the firing temperature is more than 1,250° C., and the relative dielectric constant is less than 9,000.

In sample 1-103 which is outside the scope of the present invention, since the h value is more than 0.03 as shown in Table 2, the relative dielectric constant is less than 9,000 as shown in Table 4.

In sample 1-104 which is outside the scope of the present invention, since the i value is more than 0.03 as shown in Table 2, the average lifetime under high-temperature loading conditions is short as shown in Table 4.

Samples 1-105 and 1-106, are outside the scope of the present invention, as shown in Table 2, since the y value and the j value are each 0.05 or more, and sample 1-107 is outside the scope of the present invention, the (y+j) value is 0.05 or more. As a result, according to samples 1-105, 1-106, and 1-107, as shown in Table 4, the average lifetime under high-temperature loading conditions is short.

In sample 1-108 which is outside the scope of the present invention, since the m value is less than 0.015 as shown in Table 2, the F characteristic and the Y5V characteristic are outside the specifications as shown in Table 4. In addition, in sample 1-109 which is outside the scope of the present invention, since the m value is more than 0.035 as shown in Table 2, the relative dielectric constant is less than 9,000 as shown in Table 4.

In sample 1-110 which is outside the scope of the present invention, since the n value is less than 0.015 as shown in Table 2, the F characteristic and the Y5V characteristic are outside the specifications as shown in Table 4. In addition, in sample 1-111 which is outside the scope of the present invention, since the n value is more than 0.035 as shown in Table 2, the relative dielectric constant is less than 9,000 as shown in Table 4.

In sample 1-112 which is outside the scope of the present invention, as shown in Table 2, Ma is not contained; hence, as shown in Table 4, the F characteristic and the Y5V characteristic are outside the specifications, and the average lifetime under high-temperature loading conditions is short. In addition, in sample 1-113 which is outside the scope of the present invention, as shown in Table 2, more than 1.5 moles of Ma is contained; hence, as shown in Table 4, the firing temperature exceeds 1,250° C., and the relative dielectric constant is less than 9,000.

In sample 1-114 which is outside the scope of the present invention, since Mb is not contained as shown in Table 2, the sintered body is made semiconductive as shown in Table 4. In addition, in sample 1-115 which is outside the scope of the present invention, since more than 1.0 mole of Mb is contained as shown in Table 2, the relative dielectric constant is less than 9,000 as shown in Table 4.

In sample 1-116 which is outside the scope of the present invention, as shown in Table 2, only less than 0.5 moles of Mc is contained; hence, as shown in Table 4, the firing temperature exceeds 1,250° C., and in addition, the relative dielectric constant is less than 9,000. In addition, in sample 1-117 which is outside the scope of the present invention, as shown in Table 2, more than 2.0 moles of Mc is contained; hence, as shown in Table 4, the F characteristic and the Y5V characteristic are outside the specifications, and in addition, the average lifetime under high-temperature loading conditions is short.

EXPERIMENTAL EXAMPLE 2

As stating materials of the dielectric ceramic, powdered $BaCO_3$, $TiO_2$, $ZrO_2$, $HfO_2$, $Gd_2O_3$, $MgCO_3$, $CaCO_3$, $SrCO_3$, MnO, NiO, and $SiO_2$, each having a purity of 99.8% or more, were prepared, and in addition to powdered $R_2O_3$ in which R was an element shown in the column of "$R_2O_3$" in Table 5, powdered $Al_2O_3$ was also prepared.

Next, in order to obtain a first reaction product represented by $(Ba_{0.97}Ca_{0.01}Gd_{0.02})_{0.999}(Ti_{0.95}Zr_{0.02}Hf_{0.01}Mg_{0.02})O_3$, predetermined amounts of $BaCO_3$, $TiO_2$, $ZrO_2$, $HfO_2$, $Gd_2O_3$, $MgCO_3$, and $CaCO_3$ among the above mentioned starting materials were mixed together and were then calcined in the air, followed by pulverization.

In addition, in order to obtain a second reaction product containing Ma, Mb, and Mc, $BaCO_3$, $SrCO_3$, MnO, NiO, $SiO_2$, and $TiO_2$ among the above starting materials were mixed together so that molar ratios of Ba:Sr:Mn:Ni:Si:Ti with respect to 100 moles of the first reaction product were set to 0.6:0.1:0.3:0.1:0.8:0.2, and were then calcined in the air, followed by pulverization.

Next, with respect to 100 moles of the first reaction product, in addition to the second reaction product having the above molar ratios, $R_2O_3$ including an element shown in Table 5 was added at a molar ratio shown in Table 5, and $Al_2O_3$ was also added at a molar ratio shown in Table 5, thereby forming a mixture used as the powdered dielectric ceramic starting material.

Hereinafter, by the same methods as described in Experimental Example 1, multilayer ceramic capacitors were formed, and the same evaluations as described above were performed. The evaluation results are shown in Table 5.

TABLE 5

| SAMPLE NO. | $R_2O_3$ MOLAR RATIO/ ELEMENT | $Al_2O_3$ MOLAR RATIO | FIRING TEMPERATURE (° C.) | RELATIVE DIELECTRIC CONSTANT | F CHARACTERISTIC | Y5V CHARACTERISTIC | TIME OF PEAK CAPACITANCE AT LOW ELECTRIC FIELD (° C.) | AVERAGE LIFETIME UNDER HIGH-TEMPERATURE LOADING CONDITIONS (HOURS) | AVERAGE CRYSTAL GRAIN DIAMETER (μm) |
|---|---|---|---|---|---|---|---|---|---|
| 2-1 | 0.5/Sc | 0.00 | 1240 | 9800 | WITHIN SPECIFICATION | WITHIN SPECIFICATION | 20 | 34 | 1.3 |
| 2-2 | 0.5/Y | 0.00 | 1240 | 9600 | WITHIN SPECIFICATION | WITHIN SPECIFICATION | 20 | 32 | 1.3 |

TABLE 5-continued

| SAMPLE NO. | $R_2O_3$ MOLAR RATIO/ ELEMENT | $Al_2O_3$ MOLAR RATIO | FIRING TEMPERATURE (° C.) | RELATIVE DIELECTRIC CONSTANT | F CHARACTERISTIC | Y5V CHARACTERISTIC | TIME OF PEAK CAPACITANCE AT LOW ELECTRIC FIELD (° C.) | AVERAGE LIFETIME UNDER HIGH-TEMPERATURE LOADING CONDITIONS (HOURS) | AVERAGE CRYSTAL GRAIN DIAMETER (μm) |
|---|---|---|---|---|---|---|---|---|---|
| 2-3 | 0.5/La | 0.00 | 1220 | 11000 | WITHIN SPECIFICATION | WITHIN SPECIFICATION | 55 | 15 | 2.4 |
| 2-4 | 0.5/Ce | 0.00 | 1220 | 10800 | WITHIN SPECIFICATION | WITHIN SPECIFICATION | 55 | 18 | 2.4 |
| 2-5 | 0.5/Pr | 0.00 | 1220 | 10600 | WITHIN SPECIFICATION | WITHIN SPECIFICATION | 50 | 20 | 2.2 |
| 2-6 | 0.5/Nd | 0.00 | 1220 | 10600 | WITHIN SPECIFICATION | WITHIN SPECIFICATION | 50 | 20 | 2.0 |
| 2-7 | 0.5/Pm | 0.00 | 1220 | 10400 | WITHIN SPECIFICATION | WITHIN SPECIFICATION | 45 | 23 | 2.0 |
| 2-8 | 0.5/Sm | 0.00 | 1230 | 10200 | WITHIN SPECIFICATION | WITHIN SPECIFICATION | 45 | 25 | 1.7 |
| 2-9 | 0.5/Eu | 0.00 | 1230 | 10200 | WITHIN SPECIFICATION | WITHIN SPECIFICATION | 40 | 28 | 1.7 |
| 2-10 | 0.5/Tb | 0.00 | 1230 | 9800 | WITHIN SPECIFICATION | WITHIN SPECIFICATION | 30 | 30 | 1.3 |
| 2-11 | 0.5/Dy | 0.00 | 1240 | 9700 | WITHIN SPECIFICATION | WITHIN SPECIFICATION | 25 | 32 | 1.3 |
| 2-12 | 0.5/Ho | 0.00 | 1240 | 9500 | WITHIN SPECIFICATION | WITHIN SPECIFICATION | 20 | 34 | 1.3 |
| 2-13 | 0.5/Er | 0.00 | 1250 | 9400 | WITHIN SPECIFICATION | WITHIN SPECIFICATION | 15 | 34 | 1.1 |
| 2-14 | 0.5/Tm | 0.00 | 1250 | 9300 | WITHIN SPECIFICATION | WITHIN SPECIFICATION | 10 | 37 | 1.1 |
| 2-15 | 0.5/Yb | 0.00 | 1250 | 9100 | WITHIN SPECIFICATION | WITHIN SPECIFICATION | 5 | 40 | 1.0 |
| 2-16 | 0.5/Lu | 0.00 | 1250 | 9000 | WITHIN SPECIFICATION | WITHIN SPECIFICATION | 0 | 42 | 1.0 |
| 2-17 | 0.0 | 1.00 | 1200 | 12000 | WITHIN SPECIFICATION | WITHIN SPECIFICATION | 45 | 16 | 2.5 |
| 2-18 | 0.0 | 0.00 | 1250 | 10100 | WITHIN SPECIFICATION | WITHIN SPECIFICATION | 35 | 20 | 1.4 |

As shown in Table 5, compared to sample 2-18 in which $R_2O_3$ was not contained, it was confirmed that in samples 2-1 to 2-16 in which 0.5 moles or less of $R_2O_3$ was contained with respect to 100 moles of the first reaction product used as a primary component, the lifetime under high-temperature loading conditions is improved and/or the sintering properties are improved.

In addition, compared to sample 2-18 in which $Al_2O_3$ was not contained, it was also confirmed that in sample 2-17 in which 1 mole or less of $Al_2O_3$ was contained with respect to 100 moles of the first reaction product used as a primary component, the sintering properties are improved.

EXPERIMENTAL EXAMPLE 3

As stating materials of a dielectric ceramic, powdered $BaCO_3$, $SrCO_3$, $TiO_2$, $ZrO_2$, $Gd_2O_3$, $MgCO_3$, $MnO$, and $SiO_2$, each having a purity of 99.8% or more, were prepared.

Next, by the use of the stating materials mentioned above, the powdered dielectric ceramic starting materials such as samples 3-1 to 3-5 were formed. In all the samples 3-1 to 3-5, the molar ratios of Ba:Sr:Gd:Ti:Zr:Mg:Mn:Si were set to 96.4:2:2:96:2:2:0.2:1.5.

(1) Sample 3-1

In order to obtain a first reaction product represented by $(Ba_{0.96}Sr_{0.02}Gd_{0.02})(Ti_{0.96}Zr_{0.02}Mg_{0.02})O_3$, predetermined amounts of $BaCO_3$, $SrCO_3$, $Gd_2O_3$, $TiO_2$, $ZrO_2$, and $MgCO_3$ among the above starting materials were mixed together and were then calcined in the air, followed by pulverization.

In addition, in order to obtain a second reaction product containing Ma, Mb, and Mc, $BaCO_3$, $MnO$, and $SiO_2$ among the above starting materials were mixed together so that 0.4 moles of Ba, 0.2 moles of Mn, and 1.5 moles of Si were contained with respect to 100 moles of the first reaction product, and were then calcined in the air, followed by pulverization.

Subsequently, the first reaction product and the second reaction product were mixed together to form the powdered dielectric ceramic starting material.

(2) Sample 3-2

By the same manufacturing method as that for the first reaction product of sample 3-1, a reaction product represented by $(Ba_{0.96}Sr_{0.02}Gd_{0.02})(Ti_{0.96}Zr_{0.02}Mg_{0.02})O_3$ was obtained.

Next, $BaCO_3$, $MnO$, and $SiO_2$, which were the starting materials, were mixed together so as to form a powdered dielectric ceramic starting material in which 0.4 moles of Ba, 0.2 moles of Mn, and 1.5 moles of Si were contained with respect to 100 moles of the reaction product.

(3) Sample 3-3

Predetermined amounts of the individual starting materials were mixed together so that the molar ratios of Ba:Sr:Gd:Ti:Zr:Mg:Mn:Si were set to 96.4:2:2:96:2:2:0.2:1.5, and were then calcined in the air, followed by pulverization; hence, the powdered dielectric ceramic starting material was obtained.

(4) Sample 3-4

In order to obtain a first reaction product represented by $(Ba_{0.98}Sr_{0.02})(Ti_{0.98}Zr_{0.02})O_3$, predetermined amounts of $BaCO_3$, $SrCO_3$, $TiO_2$, and $ZrO_2$ among the above starting materials were mixed together and were then calcined in the air, followed by pulverization. In this case, it should be worthy of note that Gd and Mg are not contained.

In addition, in order to obtain a second reaction product containing Ba and Si, $BaCO_3$ and $SiO_2$ among the starting materials were mixed together so that 0.4 moles of Ba and 1.5 moles of Si were obtained with respect to 98 moles of the first reaction product, and were then calcined in the air, followed by pulverization.

Subsequently, while the first reaction product and the second reaction product were mixed together, $Gd_2O_3$, $MgCO_3$, and MnO among the starting materials were added so that 2 moles of Gd, 2 moles of Mg, and 0.2 moles of Mn were contained with respect to 98 moles of the first reaction product, thereby forming the powdered dielectric ceramic starting material.

(5) Sample 3-5

As was the case of sample 3-4, a first reaction product represented by $(Ba_{0.98}Sr_{0.02})(Ti_{0.98}Zr_{0.02})O_3$ was obtained.

In addition, in order to obtain a second reaction product containing Ba, Gd, and Si, $BaCO_3$, $Gd_2O_3$, and $SiO_2$ among the starting materials were mixed together so that 0.4 moles of Ba, 2 moles of Gd, and 1.5 moles of Si were contained with respect to 98 moles of the first reaction product, and were then calcined in the air, followed by pulverization.

Subsequently, while the first reaction product and the second reaction product were mixed together, $MgCO_3$ and MnO among the stating materials were added so that 2 moles of Mg and 0.2 moles of Mn were contained with respect to 98 moles of the first reaction product, thereby forming the powdered dielectric ceramic starting material.

Hereinafter, as was the case of Experimental Example 1, multilayer ceramic capacitors were formed, and the same evaluations as described above were performed. Furthermore, in Experimental Example 3, a humidity-resistance lifetime test was performed.

In the humidity-resistance lifetime test, by using 36 samples, a voltage of 15 V is applied to each sample at a temperature of 85° C. and a humidity of 85% so that an electric field of 5 kV/mm was realized for measuring the change in insulating resistance with time. In this evaluation, as the humidity-resistance lifetime, times at which insulating resistance of individual samples reached 200 kΩ or less were regarded as the lifetime, and the average lifetime was obtained therefrom.

The results of the evaluations described above are shown in Table 6.

TABLE 6

| SAMPLE NO. | FIRING TEMPERATURE (° C.) | RELATIVE DIELECTRIC CONSTANT | F CHARACTERISTIC | Y5V CHARACTERISTIC | TIME OF PEAK CAPACITANCE AT LOW ELECTRIC FIELD (° C.) | AVERAGE LIFETIME UNDER HIGH-TEMPERATURE LOADING CONDITIONS (HOURS) | AVERAGE HUMIDITY-RESISTANCE LIFETIME (HOURS) | AVERAGE CRYSTAL GRAIN DIAMETER (μm) |
|---|---|---|---|---|---|---|---|---|
| 3-1 | 1230 | 10800 | WITHIN SPECIFICATION | WITHIN SPECIFICATION | 45 | 25 | 20 | 1.5 |
| 3-2 | 1240 | 10300 | WITHIN SPECIFICATION | WITHIN SPECIFICATION | 40 | 20 | 13 | 1.3 |
| * 3-3 | 1250 | 12000 | WITHIN SPECIFICATION | WITHIN SPECIFICATION | 50 | 2 | 1 | 3.5 |
| * 3-4 | 1230 | 8500 | WITHIN SPECIFICATION | WITHIN SPECIFICATION | 18 | 28 | 15 | 1.0 |
| * 3-5 | 1230 | 7900 | WITHIN SPECIFICATION | WITHIN SPECIFICATION | 7 | 35 | 22 | 0.8 |

In Table 6, sample Nos. provided with asterisks * are samples outside of the scope of the present invention.

According to samples 3-1 and 3-2 within the scope of the present invention, since Gd and Mg in a solid solution form are contained in the first reaction product used as the primary component of the powdered dielectric ceramic starting material, superior properties are obtained, as shown in Table 6. In particular, it should be worthy of note that a relative dielectric constant of 9,000 or more is obtained and that the high-temperature loading lifetime test and the humidity lifetime test show superior results.

On the other hand, according to sample 3-3 which is outside the scope of the present invention, since it was synthesized so that Ma, Mb, and Mc were contained in the primary component, the average crystal grain diameter of the obtained dielectric ceramic is large compared to samples 3-1 and 3-2, and in addition, the lifetime under high-temperature loading conditions and the humidity-resistance lifetime are both decreased.

In addition, according to samples 3-4 and 3-5 which are outside the scope of the present invention, since Ba and Ti in a $BaTiO_3$ base composite oxide used as the primary component of the powdered dielectric ceramic starting material are not partly replaced with Gd and Mg, respectively, the relative dielectric constant is low, such as less than 9,000, compared to samples 3-1 and 3-2.

EXPERIMENTAL EXAMPLE 4

As stating materials of a dielectric ceramic, powdered $BaCO_3$, $TiO_2$, $ZrO_2$, $HfO_2$, $MgCO_3$, $CaCO_3$, MnO, NiO, and $SiO_2$, each having a purity of 99.8% or more, were prepared, and as $Re_2O_3$, powdered $Gd_2O_3$, $Nd_2O_3$, $Dy_2O_3$ were prepared.

Next, in order to obtain a first reaction product represented by $(Ba_{0.965}Ca_{0.01}Re_{0.025})(Ti_{0.955}Zr_{0.01}Hf_{0.01}Mg_{0.025})O_3$, predetermined amounts of specific powdered compounds among the above starting materials were mixed together and were then calcined in the air, followed by pulverization. In this step, as shown in Table 7, as $Re_2O_3$ which was one of the starting materials, $Gd_2O_3$ was used for sample 4-1, $Nd_2O_3$ was used for sample 4-2, and $Dy_2O_3$ was used for sample 4-3.

In addition, in order to obtain a second reaction product containing Ma, Mb, and Mc, $BaCO_3$, $CaCO_3$, MnO, NiO, $SiO_2$, and $TiO_2$ among the above starting materials were used, and predetermined amounts thereof were mixed together so that molar ratios of Ba:Ca:Mn:Ni:Si:Ti with respect to 100 moles of the first reaction product were set to 0.5:0.2:0.2:0.4:1.2:0.2, and were then calcined in the air, followed by pulverization.

Next, the first reaction product and the second reaction product were mixed together, thereby forming the powdered dielectric ceramic starting material.

Subsequently, as was the case of Experimental Example 1, multilayer ceramic capacitors were formed, and the same evaluations as described above were performed. The evaluation results are shown in Table 7.

TABLE 7

| SAMPLE NO. | Re | FIRING TEMPERATURE (° C.) | RELATIVE DIELECTRIC CONSTANT | F CHARACTERISTIC | Y5V CHARACTERISTIC | TIME OF PEAK CAPACITANCE AT LOW ELECTRIC FIELD (° C.) | AVERAGE LIFETIME UNDER HIGH-TEMPERATURE LOADING CONDITIONS (HOURS) | AVERAGE CRYSTAL GRAIN DIAMETER (μm) |
|---|---|---|---|---|---|---|---|---|
| 4-1 | Gd | 1230 | 10800 | WITHIN SPECIFICATION | WITHIN SPECIFICATION | 28 | 34 | 2.2 |
| * 4-2 | Nd | 1210 | 12600 | WITHIN SPECIFICATION | WITHIN SPECIFICATION | 47 | 6 | 3.0 |
| * 4-3 | Dy | 1250 | 7800 | WITHIN SPECIFICATION | WITHIN SPECIFICATION | 20 | 62 | 0.7 |

In Table 7, sample Nos. provided with asterisks * are samples outside of the scope of the present invention.

According to sample 4-1 within the scope of the present invention, since Gd is selected as an element for replacing a part of Ba which forms a $BaTiO_3$ base composite oxide which is the first reaction product used as a primary component, as shown in Table 7, superior properties are obtained. In particular, it should be worthy of note that a relative dielectric constant of 9,000 or more is obtained and that the high-temperature loading lifetime test shows a superior result.

On the other hand, since Nd is selected as an element for replacing a part of Ba which forms a $BaTiO_3$ base composite oxide which is the first reaction product used as a primary component according to sample 4-2 which is outside the scope of the present invention, the humidity-resistance lifetime is short, compared to sample 4-1, as shown in Table 7.

In addition, since Dy is selected as an element for replacing a part of Ba which forms a $BaTiO_3$ base composite oxide which is the first reaction product used as a primary component according to sample 4-3 which is outside the scope of the present invention, the relative dielectric constant is less than 9,000, as shown in Table 7.

INDUSTRIAL APPLICABILITY

A dielectric ceramic according to the present invention is suitably used as a material forming dielectric ceramic layers provided for a multilayer ceramic capacitor which is required to have superior reliablity at a high temperature.

The invention claimed is:

1. A dielectric ceramic comprising:
   a primary component comprising a barium titanate base composite oxide represented by the general formula

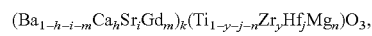
   $(Ba_{1-h-i-m}Ca_hSr_iGd_m)_k(Ti_{1-y-j-n}Zr_yHf_jMg_n)O_3$, in which $0.995 \leq k \leq 1.015$, $0 \leq h \leq 0.03$, $0 \leq i \leq 0.03$, $0.015 \leq m \leq 0.035$, $0 \leq y < 0.05$, $0 \leq j < 0.05$, $0 \leq (y+j) < 0.05$, and $0.015 \leq n \leq 0.035$, the Ba being partly replaced with Gd, and the Ti being partly replaced with Mg; and an additive component containing Ma, Mb and Mc in which Ma is at least one of Ba, Sr, and Ca, Mb is at least one of Mn and Ni, and Mc is Si or both Si and Ti, and in which Ma is contained in a positive amount which is less than 1.5 moles with respect to 100 moles of the primary component, Mb is contained in a positive amount which is less than 1.0 mole with respect to 100 moles of the primary component, and Mc is contained in a positive amount in the range of from 0.5 to 2.0 moles with respect to 100 moles of the primary component.

2. The dielectric ceramic according to claim 1, further comprising, with respect to 100 moles of the primary component, 0.5 moles or less of $R_2O_3$ in which R is at least one lanthanoid element other than Gd, Y, and Sc as a subcomponent.

3. The dielectric ceramic according to claim 2, further comprising, with respect to 100 moles of the primary component, a positive amount which is 1 mole of less of $Al_2O_3$.

4. A multilayer ceramic capacitor comprising: a laminate having dielectric ceramic layers which are laminated to each other and interior electrodes provided along interfaces between dielectric ceramic layers overlapped with each other in the lamination direction; and exterior electrodes on exterior surfaces of the laminate so as to be electrically connected to specific ones of the interior electrodes, wherein the dielectric ceramic layers each comprise the dielectric ceramic according to claim 2, and the interior electrodes each comprise a base metal.

5. A multilayer ceramic capacitor comprising: a laminate having dielectric ceramic layers which are laminated to each other and interior electrodes provided along interfaces between dielectric ceramic layers overlapped with each other in the lamination direction; and exterior electrodes on exterior surfaces of the laminate so as to be electrically connected to specific ones of the interior electrodes, wherein the dielectric ceramic layers each comprise the dielectric ceramic according to claim 3, and the interior electrodes each comprise a base metal.

6. The dielectric ceramic according to claim 3, wherein the primary component contains less than 0.02 w % of alkali metal oxide and the dielectric ceramic has an average crystal grain size of 2.5 μm or less.

7. A multilayer ceramic capacitor comprising: a laminate having dielectric ceramic layers which are laminated to each other and interior electrodes provided along interfaces between dielectric ceramic layers overlapped with each other in the lamination direction; and exterior electrodes on exterior surfaces of the laminate so as to be electrically connected to specific ones of the interior electrodes, wherein the dielectric ceramic layers each comprise the dielectric ceramic according to claim 6, and the interior electrodes each comprise a base metal.

8. The dielectric ceramic according to claim 6, wherein the dielectric ceramic has an average crystal grain size of 1.5 μm or less.

9. The dielectric ceramic according to claim 8, wherein the dielectric ceramic has an average crystal grain size of 1.5 μm or less.

10. A multilayer ceramic capacitor comprising: a laminate having dielectric ceramic layers which are laminated to each other and interior electrodes provided along interfaces between dielectric ceramic layers overlapped with each other in the lamination direction; and exterior electrodes on exterior surfaces of the laminate so as to be electrically connected to specific ones of the interior electrodes, wherein the dielectric ceramic layers each comprise the dielectric ceramic according to claim 1, and the interior electrodes each comprise a base metal.

11. The dielectric ceramic according to claim 1, further comprising, with respect to 100 moles of the primary component, 1 mole of less of $Al_2O_3$.

12. The dielectric ceramic according to claim 11, wherein the primary component contains less than 0.02 w % of alkali metal oxide and the dielectric ceramic.

13. A multilayer ceramic capacitor comprising: a laminate having dielectric ceramic layers which are laminated to each other and interior electrodes provided along interfaces between dielectric ceramic layers overlapped with each other in the lamination direction; and exterior electrodes on exterior surfaces of the laminate so as to be electrically connected to specific ones of the interior electrodes, wherein the dielectric ceramic layers each comprise the dielectric ceramic according to claim 12, and the interior electrodes each comprise a base metal.

14. The dielectric ceramic according to claim 12, wherein the dielectric ceramic has an average crystal grain size of 1.5 μm or less.

15. The dielectric ceramic according to claim 14, wherein the dielectric ceramic has an average crystal grain size of 1 μm or less.

16. The dielectric ceramic according to claim 1, wherein $0.997 \leq k \leq 1.01$, $0 \leq h \leq 0.01$, $0 \leq i \leq 0.02$, $0.02 \leq y < 0.03$, $0 \leq j < 0.04$, $0.02 \leq (y+j) < 0.04$; Ma is 0.1-0.8 moles with respect to 100 moles of the primary component; Mb is 0.2-0.9 mole with respect to 100 moles of the primary component; Mc is 0.8 to 1.5 moles with respect to 100 moles of the primary component; and the dielectric ceramic has an average crystal grain size of 2.5 μm or less.

17. A method for manufacturing a dielectric ceramic comprising:

providing a reaction product comprising a barium titanate base composite oxide represented by the general formula $(Ba_{1-h-i-m}Ca_hSr_iGd_m)_k(Ti_{1-y-j-n}Zr_yHf_jMg_n)O_3$, in which $0.995 \leq k \leq 1.015$, $0 \leq h \leq 0.03$, $0 \leq i \leq 0.03$, $0.015 \leq m \leq 0.035$, $0 \leq y < 0.05$, $0 \leq j < 0.05$, $0 \leq (y+j) < 0.05$, and $0.015 \leq n \leq 0.035$, the Ba being partly replaced with Gd, and the Ti being partly replaced with Mg;

providing an additive containing Ma which is at least one of Ba, Sr, and Ca, Mb which is at least one of Mn and Ni, and Mc which is Si or both Si and Ti;

mixing the reaction product, Ma, Mb, and Mc so that a positive amount which is less than 1.5 moles of Ma is contained with respect to 100 moles of the reaction product, a positive amount which is less than 1.0 mole of Mb is contained with respect to 100 moles of the reaction product, and 0.5 to 2.0 moles of Mc is contained with respect to 100 moles of the reaction product;

firing the resulting mixture.

18. The method for manufacturing a dielectric ceramic, according to claim 17, wherein, prior to firing a positive amount which is 0.5 moles or less of $R_2O_3$ in which R is at least one lanthanoid element other than Gd, Y, and Sc is mixed as a subcomponent with respect to 100 moles of the reaction product.

19. The method for manufacturing a dielectric ceramic, according to claim 18, wherein, prior to firing, a positive amount which is 1 mole or less of $Al_2O_3$ is further mixed with respect to 100 moles of the reaction product.

20. The method for manufacturing a dielectric ceramic, according to claim 17, wherein, prior to firing, a positive amount which is 1 mole or less of $Al_2O_3$ is further mixed with respect to 100 moles of the reaction product.

* * * * *